United States Patent [19]

Erickson et al.

[11] Patent Number: 5,324,398

[45] Date of Patent: Jun. 28, 1994

[54] CAPACITIVE DISCHARGE CONTROL CIRCUIT FOR USE WITH ELECTROLYTIC FLUID TREATMENT SYSTEMS

[75] Inventors: Robert K. Erickson, Belmont; Francois X. Prinz, San Jose, both of Calif.

[73] Assignee: Water Regeneration Systems, Inc., Belmont, Calif.

[21] Appl. No.: 901,411

[22] Filed: Jun. 19, 1992

[51] Int. Cl.[5] ............................................. C02F 1/461
[52] U.S. Cl. .................................... 204/149; 204/152; 204/228; 204/305; 204/400; 204/406; 204/412
[58] Field of Search ............... 204/149, 152, 228, 305, 204/400, 406, 412

[56] References Cited

U.S. PATENT DOCUMENTS

| | | | |
|---|---|---|---|
| 3,519,550 | 7/1970 | Winslow et al. | 204/305 |
| 3,532,614 | 10/1970 | Shirley | 204/191 |
| 3,679,556 | 9/1968 | Doevenspeck | 204/269 |
| 3,865,710 | 2/1975 | Phipps | 204/228 |
| 4,119,520 | 10/1978 | Paschakarnis et al. | 204/276 |
| 4,263,114 | 4/1981 | Shindell | 204/149 |
| 4,382,231 | 5/1983 | Miller | 324/439 |
| 4,400,253 | 8/1983 | Prestridge et al. | 204/186 |
| 4,419,206 | 12/1983 | Frame | 204/228 |
| 4,629,992 | 12/1986 | Nudelmont | 324/464 |
| 4,734,176 | 3/1988 | Zemba, Jr. et al. | 204/149 |
| 4,839,002 | 6/1989 | Pernick et al. | 204/58 |
| 4,917,782 | 4/1990 | Davies | 204/152 |
| 4,937,557 | 6/1990 | Tucci et al. | 340/603 |
| 4,986,906 | 1/1991 | Dadisman | 204/169 |
| 5,055,170 | 10/1991 | Saito | 204/228 |
| 5,057,212 | 10/1991 | Burrows | 210/85 |
| 5,062,940 | 11/1991 | Davies | 204/228 |

FOREIGN PATENT DOCUMENTS

0329562  8/1989  European Pat. Off. .
203896  11/1983  Fed. Rep. of Germany .

Primary Examiner—John Niebling
Assistant Examiner—Arun S. Phasge
Attorney, Agent, or Firm—Christensen, O'Connor, Johnson & Kindness

[57] ABSTRACT

An electrolytic filter system (16) is disclosed for use in treating fluid provided by a fluid source (12) to a supplied environment (14). The system includes an electrolytic cell (18), whose operation is governed by a control circuit (20) to allow a desired average current to be applied to the cell substantially independent of variations in fluid resistivity, to allow the cell to simultaneously achieve, for example, the desired removal of contaminants, killing of biological materials, and alteration of the fluid's chemical characteristics, and to provide relatively high levels of energy to the fluid quickly and efficiently.

27 Claims, 6 Drawing Sheets

CAPACITIVE DISCHARGE CONTROL CIRCUIT FOR USE WITH ELECTROLYTIC FLUID TREATMENT SYSTEMS

FIELD OF THE INVENTION

This invention relates to electrolytic fluid treatment systems and, more particularly, to circuits for use in controlling such systems.

BACKGROUND OF THE INVENTION

Electrolytic fluid treatment systems are widely used to, for example, remove impurities and contaminants from fluids. In such systems, the fluid to be treated is passed between one or more pairs of electrodes. An electric potential applied to the electrodes establishes an electric current between the electrodes. As a result, impurities in the fluid migrate and adhere to the electrodes, biological materials in the fluid are killed, and the fluid's chemical composition may be altered.

One fluid that is commonly processed by electrolytic fluid treatment systems is water. The electrolytic treatment of water is, however, complicated by the widely varying water characteristics encountered from one water source to another. In that regard, the resistivity of water, which is inversely proportional to conductivity, commonly varies over a range extending from 30 to 1400 ohm-meter. Such resistivity variations may significantly alter the performance of an electrolytic filter system.

More particularly, the interelectrode resistance is dependent upon the resistivity of the water flowing between the electrodes. With a fixed electric potential applied to the electrodes, current flow between the electrodes will vary in inverse proportion to the water's resistance. If water resistivity is relatively high, the current may be too low to achieve the desired treatment of the water. On the other hand, if water resistivity is relatively low, the current may be so high as to damage or otherwise decrease the life of system components.

A variety of different systems have been developed that attempt to accommodate such variations in water resistivity. For example, circuits have been developed to expose water purification and ion generation systems to relatively constant load resistances, regardless of variations in water resistivity. In that regard, U.S. Pat. No. 4,769,119 (Grundler) discloses a water ionizing device that includes several electrodes. If the resistivity of the water being ionized is relatively low, a relatively high resistance is introduced in series with the electrodes. On the other hand, if the water's resistivity is relatively high, a relatively low resistance is introduced in series with the electrodes. In either case, by keeping the system's total resistive load constant, a constant current flow is maintained between the electrodes.

U.S. Pat. No. 4,986,906 (Dadisman) describes another variation of this approach. The Dadisman water purification system includes a constant current control circuit in which changes in water resistance cause opposing changes in the effective resistance of a field-effect transistor (FET) included in the circuit. These changes in FET resistance offset the changes in water resistance, allowing the current to be kept substantially constant.

Unfortunately, the approaches taken by Grundler and Dadisman have certain limitations. In that regard, the Grundler and Dadisman circuits both increase circuit resistance to offset decreases in water resistance. As a result, energy is dissipated in circuit components rather than being used to treat water, making the circuits relatively inefficient. In addition, the Grundler and Dadisman circuits are both relatively complex.

An alternative method of handling variations in water resistivity is to provide an electronic control circuit that allows water purification and ion generation systems to maintain constant current flows, substantially independent of variations in water resistivity. In that regard, U.S. Pat. No. 4,119,520 (Paschakarnis et al.) discloses a water purification unit that includes such a current control circuit. The current to be controlled flows through a resistor, as well as between the electrodes. A differential amplifier and transistor cooperatively control the current by keeping the voltage drop across the resistor equal to the reference potential across a diode. As a result, the current flowing between the electrodes is kept constant.

Similarly, U.S. Pat. No. 5,055,170 (Saito) discloses an ionic water generator that accounts for variations in water resistivity. In that regard, the system employs a central processing unit that calculates the appropriate voltage to be applied to the electrodes for the water being processed. This voltage is computed by multiplying some voltage corresponding to the desired ion concentration by a factor equal to the resistance of the water actually being processed divided by the resistance of some reference water.

As will be appreciated, the Paschakarnis et al. and Saito systems exhibit several shortcomings. First, the control circuits of both systems are relatively complex. Because the Paschakarnis et al. circuit introduces an additional resistance into the current path, it is also relatively inefficient. The Saito circuit, in turn, disadvantageously requires reference measurements to be made for subsequent use in controlling the voltage applied to the electrodes.

Another circuit for controlling an ion generator in a water purification system is disclosed in U.S. Pat. No. 4,734,176 (Zemba, Jr.). The circuit controls the duty-cycle of energy applied to the generator to achieve the desired level of purification for various applications and water conditions. In that regard, an operator apparently evaluates water conditions and then manually adjusts the control circuit to effect a desired change in duty cycle.

Like the other circuits described above, the Zemba, Jr. arrangement has certain limitations. For example, the ability of the Zemba, Jr. circuit to handle variations in water resistivity is not discussed and is uncertain. Also, because the circuit does not automatically respond to changing water conditions, it may fail to achieve the desired regulation in many instances.

Turning now to another problem experienced in the electrolytic treatment of fluids, conventional electrolytic fluid treatment systems typically do not perform equally well in removing impurities, killing biological materials, and altering the fluid's chemical composition. At best, existing systems achieve one of the desired objectives relatively well, while exhibiting compromised performance with respect to the other objectives. More particularly, most such systems fail even to differentiate between these various objectives, much less achieve them fully and simultaneously.

One final problem encountered in the electrolytic treatment of fluids is the limited ability of conventional systems to provide large quantities of energy to the fluid over brief intervals in an efficient manner. For example, while some systems may be suitable for passing relatively low currents through the fluid during short intervals, they are typically unable to apply higher currents to the fluid. Alternatively, while some systems are able to provide high currents to the fluid quickly, they are relatively inefficient.

In view of these observations, it would be desirable to provide a control circuit suitable for controlling the operation of an electrolytic fluid treatment system substantially independent of variations in the resistivity of fluid treated by the system. It would also be desirable to provide a control circuit that allows several aspects of the system's performance to be optimized, without undue circuit complexity, inefficiency, or operator intervention and that is able to provide relatively large quantities of energy to the fluid quickly and efficiently.

SUMMARY OF THE INVENTION

A method is described for controlling the operation of an electrolytic system used in the treatment of a fluid exhibiting a potentially variable characteristic. The method includes the steps of producing a plurality of pulses of electrical energy for application to the electrolytic system. The pulses exhibit parameters including a pulse repetition rate, pulse duration, and pulse amplitude. The method also includes the step of evaluating the potentially variable characteristic of the fluid. The method further includes the step of controlling one of the parameters exhibited by the plurality of pulses in response to the evaluation of the potentially variable characteristic of the fluid.

In accordance with another aspect of the invention, a method is disclosed for electrolytically treating water. The method includes the step of positioning the water between at least one pair of electrodes. The method also includes the step of producing a voltage across a capacitor and selectively coupling the capacitor to the electrodes, causing the voltage across the capacitor to decay and a current to flow through the water between the at least one pair of electrodes.

The method may be further for electrolytically treating the water in a manner that is relatively independent of variations in the electrical resistivity of the water. Thus, the method further includes the steps of sensing the resistivity of the water and selectively disconnecting the capacitor from the electrodes when the voltage across the capacitor decays to a pre-determined threshold. The steps of selectively coupling and selectively disconnecting are repeated at a predetermined repetition rate and are separated by an interval of time whose length is dependent upon the sensed resistivity of the water.

In accordance with another aspect of the invention, a circuit is disclosed for providing a desired electric current to the electrodes of an electrolytic fluid treatment system, substantially independent of variations in the fluid passed between the electrodes and treated by the system. The circuit includes a sensor for sensing variations in the fluid passed between the electrodes. The circuit also includes a delivery device for delivering a plurality of electric current pulses to the electrodes, the electric current pulses exhibiting a pulse duration, pulse repetition rate, and pulse amplitude. Finally, a control circuit, responsive to the sensor, is included for controlling the delivery device to ensure that the desired electric current provided to the electrodes remains substantially independent of variations in the fluid passed between the electrodes.

In accordance with yet another aspect of the invention, an electrolytic fluid treatment system is disclosed. The system includes at least one pair of electrodes defining a water flow path therebetween. A capacitor is included for storing electrical energy for delivery to the pair of electrodes. A switching circuit is included for causing energy stored by the capacitor to be delivered to the pair of electrodes as a plurality of current pulses. If the system is further suitable for treating fluids of varying resistivity, an ammeter is included for producing an output representative of the current pulses delivered to the pair of electrodes. A control circuit is then also included for controlling the switching circuit in response to the output of the ammeter.

In accordance with one additional aspect of the invention, a method and system for electrolytically filtering water are disclosed. In that regard, water is passed between at least one pair of electrodes. A varying voltage is also applied across the electrodes to effect the desired filtering of the water. The method and system may be, more particularly, for treating several aspects of the water and the varying voltage may include a range selected to treat the several aspects.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
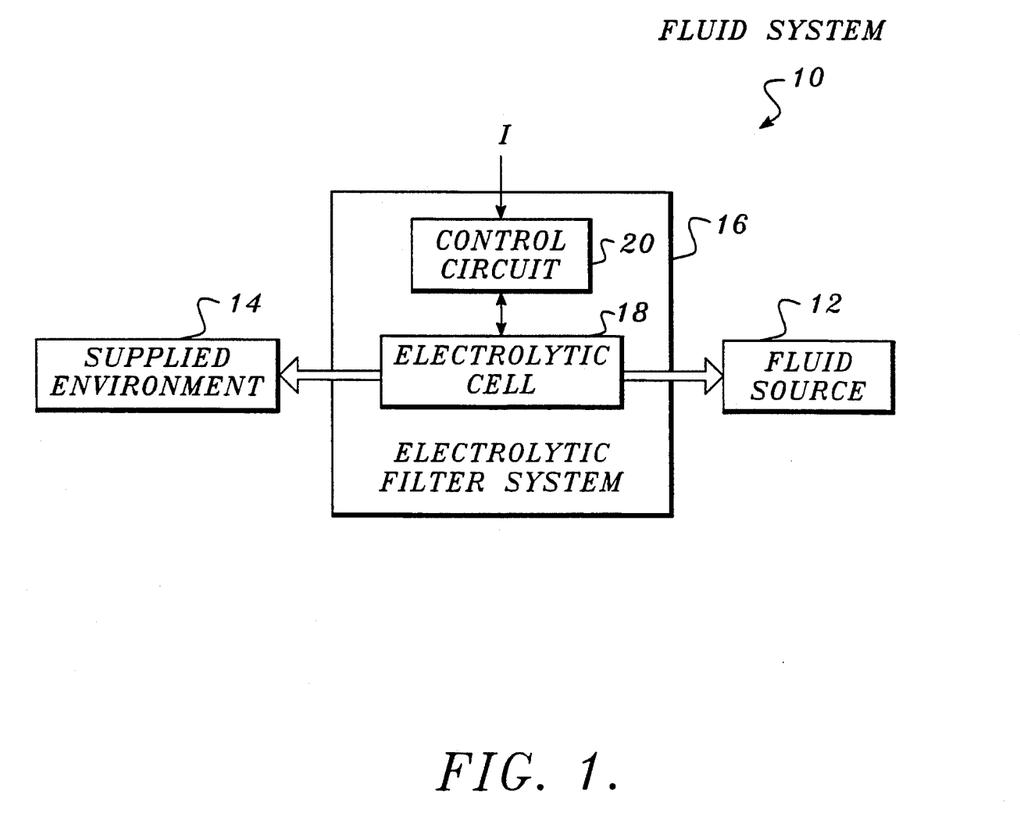
FIG. 1 is a block diagram of a fluid system employing an electrolytic filter constructed in accordance with the present invention.

Referring now to FIG. 1, a fluid system 10 constructed in accordance with the invention is shown. Fluid system 10 includes a fluid source 12 that provides fluid to a supplied environment 14 via an electrolytic fluid treatment system, such as filter system 16. As will be described in greater detail below, the electrolytic filter system 16 is designed to operate in a manner that is not adversely impacted by variations in the fluid's resistivity and that is equally effective in removing impurities, killing biological materials, and altering the chemical composition of the fluid. The system 16 also allows relatively high energy levels to be applied to the fluid quickly and efficiently.

Before discussing the construction and operation of system 10 in greater detail, the physics involved will be briefly reviewed. In that regard, conventional electrolytic filter systems pass electric current between at least one pair of electrodes to effect the desired filtration of fluids located between the electrodes. The ability of the system to cause impurities to migrate to the electrodes, kill biological material, and alter the chemical composition of the fluids depends, in part, upon the magnitude of the current flow between the electrodes.

Assuming that a fixed voltage V is applied across two electrodes, the magnitude of the current I flowing between the electrodes varies substantially in accordance with the expression:

$$I = V/R \qquad (1)$$

where R is the resistance of the fluid between the electrodes. The resistance R of the fluid can be determined in accordance with the expression:

$$R = \rho L / A \qquad (2)$$

where $\rho$ is the resistivity of the fluid, L is the separation of the two electrodes, and A is the cross-sectional area of the fluid path between the electrodes. The resistivity $\rho$, in turn, varies in accordance with the expression:

$$\rho = \rho_o [1 + \alpha(T - T_o)] \qquad (3)$$

where $\rho_o$ is the resistivity of the fluid at some temperature $T_o$, T is the actual temperature of the fluid, and $\alpha$ is a temperature coefficient. As a result, the resistivity and, hence, resistance of the fluid defining the current path between electrodes changes in response to both fluid and temperature fluctuations.

As will be appreciated from equation (1), with a fixed voltage applied between the two electrodes, the magnitude of the current I flowing therebetween depends upon the fluid resistance R. The resistivity $\rho$ (and its reciprocal, conductivity $\sigma$) of the fluid may vary considerably with time, due to differences in the composition of the fluid as well as its temperature. Such changes alter the interelectrode resistance R and, hence, current I and potentially impact the filter's effectiveness.

As will be described in greater below, if energy is applied to the electrodes in the form of a plurality of pulses, some of the characteristics of the pulses can be controlled in response to variations in fluid resistivity to maintain a relatively constant average current flow between the electrodes. The electrolytic filter system 16 described below maintains the desired current in this manner.

Addressing now the construction of the various components of system 10 individually, the fluid source 12 may take any of a variety of forms. Typically, the fluid source 12 will include a fluid supply or reservoir, as well as some arrangement for providing fluid to the filter system 16 in a controllable and pressurized manner. To that end, the fluid source 12 may include, for example, a pump and various valves.

One common example of a fluid source 12 is a municipal water supply. As will be appreciated, the water available from many such supplies may exhibit widely varying characteristics. For example, it is not uncommon for the resistivity of water from different municipalities to range between 30 to 1400 ohm-meter.

Like the fluid source 12, supplied environment 14 may take a variety of different forms. Examples of supplied environments 14 include swimming pools, water heaters, and drinking water dispensers. In some instances, although not shown in FIG. 1, the supplied environment 14 may use the fluid and return it to the source 12 for treatment. In other instances, the supplied environment 14 may represent the ultimate destination of the fluid.

The heart of fluid system 10 is the electrolytic filter system 16. As indicated in FIG. 1, filter system 16 includes an electrolytic cell 18 and control circuit 20. As will be described in greater detail below, the electrolytic cell 18 processes fluid flowing from source 12 to the supplied environment 14. The control circuit 20 provides electrical energy to the cell 18 in a controlled fashion, allowing cell 18 to effect the desired filtration of the fluid substantially independent of variations in fluid resistivity.

Figure 2:
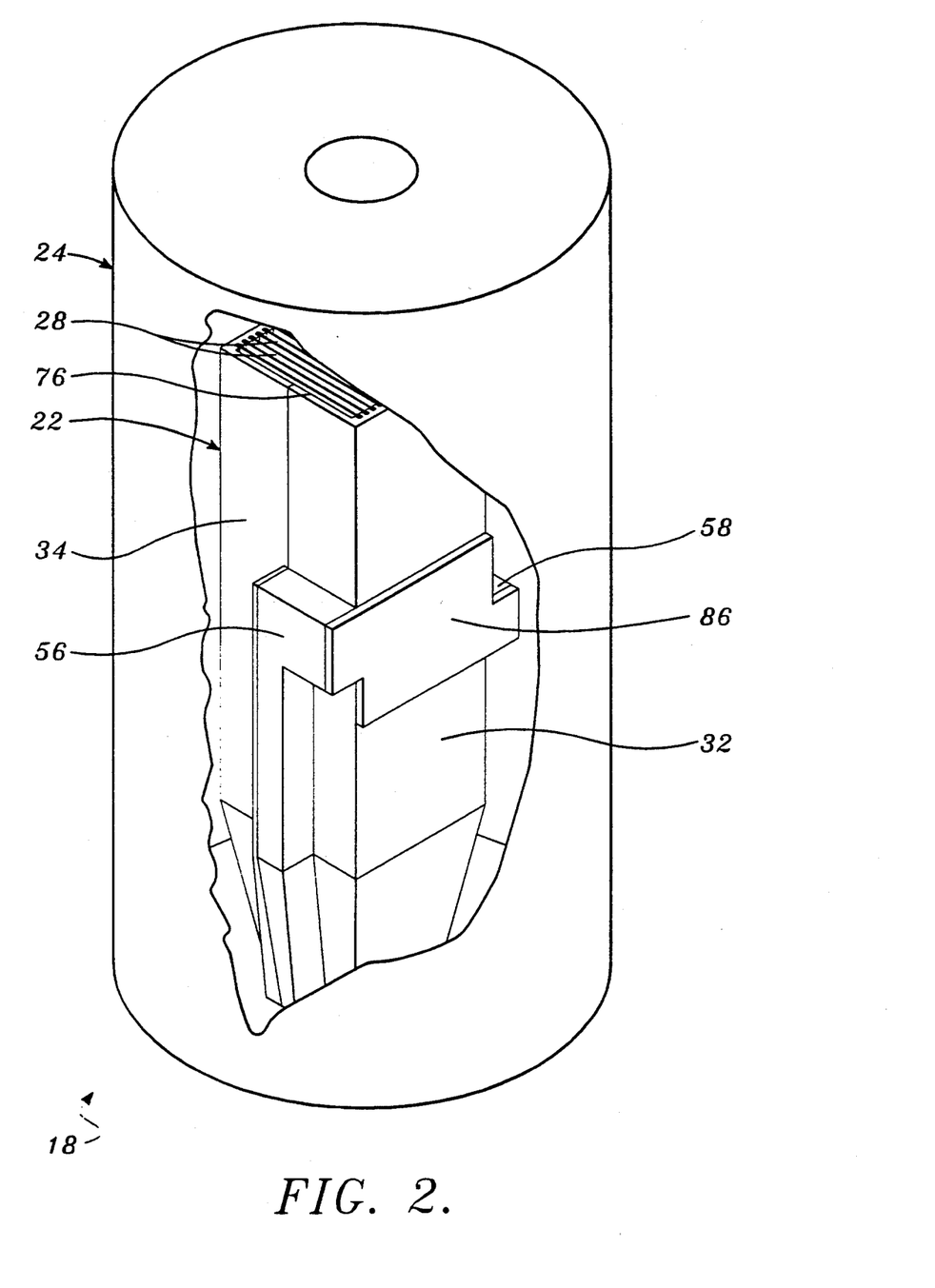
FIG. 2 is an illustration of an electrolytic cell included in the filter of FIG. 1.

Reviewing these two primary components of filter system 16 in greater detail, as shown in FIG. 2, the electrolytic cell 18 includes an electrode assembly 22 positioned within a reservoir 24. The electrode assembly 22, which is shown in greater detail in FIG. 3, includes as its primary components a housing 26, a plurality of electrodes 28, and electrical wiring 30. The housing includes a first section 32 and second section 34, which cooperatively define an electrode chamber 36 and inlet chamber 38 therebetween.

Figure 3:
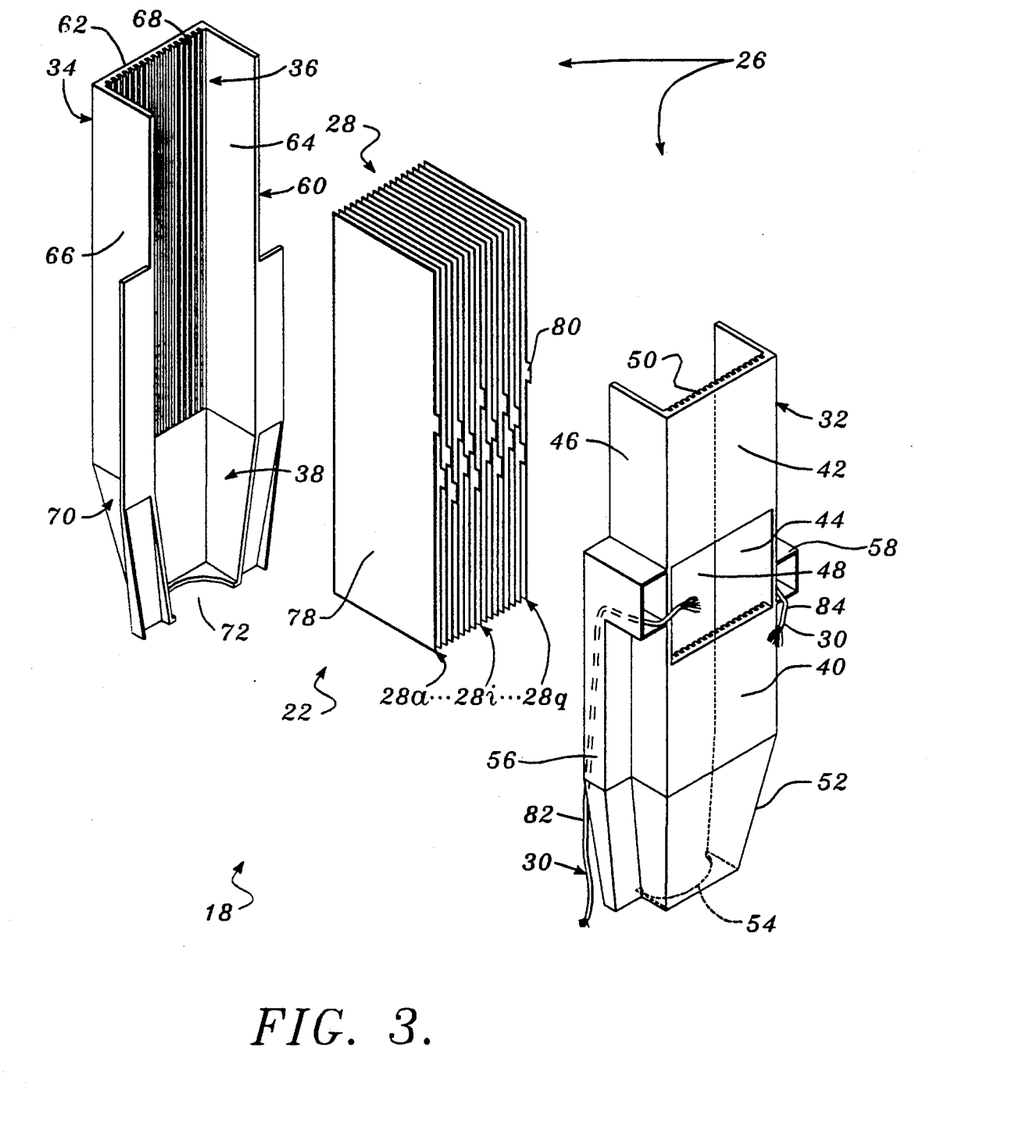
FIG. 3 is a top perspective of an electrode assembly included in the cell of FIG. 2, with parts shown in exploded relationship.

Addressing the construction of the first section 32 of housing 26 in greater detail, the portion of the first section 32 that defines the electrode chamber 36 includes a channel piece 40 formed by a panel 42 and sides 44 and 46. A rectangular opening 48 is provided in panel 42, midway between its two ends, and a plurality of longitudinally extending, electrode retention grooves 50 are provided on the inside of panel 42. The first section 32 also includes an inlet piece 52, which extends from the channel piece 40 and exhibits a tapered cross section. A semicircular opening 54 is provided at the end of inlet piece 52 to form one-half of a fluid inlet.

Roughly L-shaped wiring conduits 56 and 58 are provided on the sides of the first section 32 of housing 26. As illustrated in FIG. 3, conduits 56 and 58 are substantially rectangular in cross section and include openings positioned adjacent the opening 48 in panel 42. These openings are provided in a longitudinally staggered configuration that allows the electrical wiring 30 received within the conduits to be attached to the various electrodes in a relatively streamlined fashion described in greater detail below. The conduits 56 and 58 extend axially along the open side of first section 32, terminating in openings adjacent the end of inlet piece 52. The electrical wiring 30 extends from these openings to the control circuit 20.

The second section 34 of housing 26 mirrors the first section 32, with the exceptions that the opening 48 and conduits 56 and 58 are eliminated. In that regard, the second section 34 includes a channel piece 60 having a panel 62 and two sides 64 and 66. A plurality of electrode retention grooves 68 are provided on the inside of panel 62 for receiving the electrodes 28. A tapered inlet piece 70 extends from the channel piece 60 and includes a semicircular opening 72, which, in cooperation with opening 54, defines a fluid inlet.

As will be appreciated, the relative size, shape, construction and materials of the housing 26 can be altered as desired. In the currently preferred arrangement, however, housing 26 is generally rectangular in cross section and defines an electrode chamber 36 that is roughly 20.5 centimeters by 5.4 centimeters by 5.1 centimeters. The electrode retention grooves 50 and 68 are roughly 0.06 centimeters wide, spaced apart by a distance of roughly 0.2 centimeters and may extend the full length of the electrode plates or be shorter and spaced apart to support the electrode plates at several points. The inlet chamber 38 is roughly 8.1 centimeters long and tapers to a cross section of roughly 4.8 centimeters by 4.5 centimeters. When the first section 32 and second section 34 are joined, the semicircular openings 54 and 72 define a fluid inlet 74 of roughly 9.2 square centimeters. Similarly, the open upper end of housing 26, defined by the first section 32 and second section 34 provides a square fluid outlet 76 of roughly 25.8 square centimeters. Sections 32 and 34 are preferably molded from a fluid impervious plastic, such as polyethylene terephthalate glycol (PETG).

Having reviewed the construction of housing 26, the construction of electrodes 28 will now be considered in greater detail. As shown in FIG. 3, seventeen electrodes 28 are preferably employed. Each electrode 28 includes a substantially rectangular body 78 that is positioned within housing 26 to contact the fluid to be filtered. A connection tab 80, aligned in the same plane as electrode body 78, projects from one edge of the electrode body 78. As will be described in greater detail below, the connection tabs 80 are designed to extend through opening 48 in the first section 32 of housing 26 to allow electrical connections to be made to the electrodes 28.

The electrodes 28 are preferably made of an electrically conductive fluid impervious material such as a ceramic. The electrode body 78 is roughly 20.3 centimeters by 6.0 centimeters by 0.06 centimeters. Connection tab 80 is, for example, roughly 0.6 centimeters by 0.5 centimeters by 0.06 centimeters. As shown in FIG. 3, the location of the connection tab 80 between the two ends of the electrode body 78 varies from electrode to electrode.

In that regard, the electrodes 28 are separately designated 28a through 28q in FIG. 3. The tabs 80 on electrodes 28a, 28b, 28f, 28i, 28l, 28n, and 28q are all spaced roughly 8.3 centimeters from one end of their respective electrode bodies 78, with the orientation of electrodes 28a, 28i, and 28q being reversed from that of electrodes 28b, 28f, 28j, and 28n. The tabs 80 on electrodes 28c, 28g, 28k, and 28o are spaced midway between the two ends of their respective electrode bodies 78. Finally, the tabs 80 on the remaining electrodes 28d, 28e, 28h, 28l, 28m, and 28p are spaced roughly 9.2 centimeters from one end of their respective electrode bodies 78, with the orientation of electrodes 28d, 28h, 28l, and 28p being reversed from that of electrodes 28e and 28m. As shown in FIG. 3, the varied location of the electrode tabs 80 effects a staggered alignment that makes it easier to provide electrical connections to the electrodes 28.

With the first section 32 and second section 34 of housing 26 secured together by epoxy or other fasteners (not shown), the electrodes 28 are retained in slots 50 and 68 and the tabs 80 on the various electrodes 28 project from the opening 48 in housing 26, allowing electrical connections to be made thereto. In that regard, the electrical cables 30 are separately identified in FIG. 3 as cables 82 and 84. Cable 82 is a standard wire cable positioned within wiring conduit 56 and has one end connected to the connection tabs 80 of electrodes 28a, 28c, 28e, 28g, 28i, 28k, 28m, 28o, and 28q by, for example, soldering or fastening hardware (not shown). The other end of cable 82 terminates at the control circuit 20. Similarly, cable 84 is a standard wire cable received within wiring conduit 58. One end of cable 84 is coupled to the connection tabs 80 of electrodes 28b, 28d, 28f, 28h, 28j, 28l, 28n, and 28p and the other end terminates at the control circuit 20.

Once the housing sections 32 and 36 have been fastened together and the appropriate connections made between cables 82 and 84 and the various electrodes 28, the connection tabs 80, electrical connections between cables and tabs, and the opening 48 are enclosed by an encapsulant, such as an epoxy. As a result, the electrical connections are insulated from one another and protected from environmental contaminants. Further, by closing the opening 48, fluid flow through the electrode assembly 22 is confined to a path traversing substantially the full length of the spaced-apart electrodes 28.

As noted previously, the electrode assembly 22 is positioned in, and axially aligned with, reservoir 24. The reservoir 24 is employed to store fluid processed by the electrode assembly 22 before it is provided to the supplied environment 14. The reservoir 24 may, for example, be a roughly cylindrical structure made of a fluid impervious plastic such as spun fiber glass (reinforced), acrylonitrite butadiene styrene (ABS). The reservoir 24 preferably is roughly 0.6 centimeters thick, 100 centimeters long and 40.6 centimeters in diameter. The fluid inlet 74 of electrode assembly 22 extends through the base of reservoir 24, defining a fluid inlet into reservoir 24. A fluid outlet 88 is provided in the top of reservoir 24. As will be appreciated, the reservoir may be equipped with a removable cover, in which the outlet 88 would be provided, allowing access to the electrode assembly 22.

Figure 4:
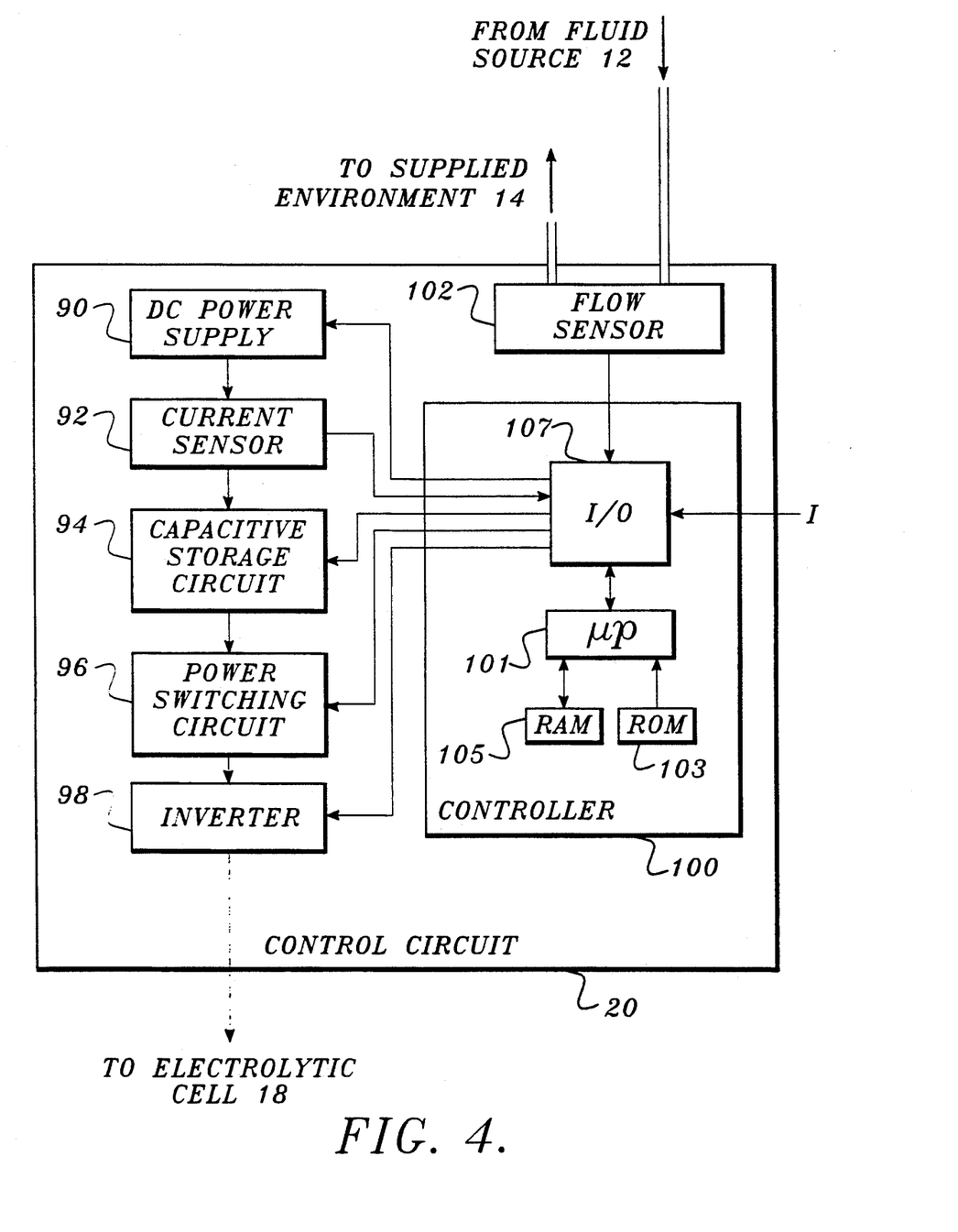
FIG. 4 is a block diagram of a control circuit included in the filter of FIG. 1.

Having reviewed the basic construction of electrolytic cell 18, a more detailed discussion of the control circuit 20 will now be provided. As shown in FIG. 4, a first embodiment of the control circuit 20 includes, for example, a DC power supply 90, current sensor 92, capacitive storage circuit 94, power switching circuit 96, inverter 98, controller 100, and flow sensor 102.

Reviewing these components of control circuit 20 individually, the DC power supply 90 may be of any conventional design and provides energy for use by the electrolytic cell 18 in achieving the desired treatment of the fluid. As shown in FIG. 4, the power supply 90 receives inputs from controller 100, allowing the manner in which energy is output by supply 90 to be controlled.

In a preferred embodiment, power supply 90 includes a transformer for converting a source of AC input voltage from one level to another, for example, reduced level. A rectifier circuit may also be included to convert the transformed AC voltage to a suitable DC voltage. Finally, a regulation and filtration circuit may be included to ensure that the rectified voltage, available between positive and negative output terminals of supply 90, has the desired DC characteristics.

The current sensor 92 is employed to measure the current drawn from supply 90. Although the location of the current sensor 92 within the control circuit 20 may be altered, in the preferred arrangement the sensor 92 is coupled between the positive or negative output terminal of supply 90 and the capacitive storage circuit 94. The current sensor 92 may be, for example, an ammeter capable of producing outputs representative of currents ranging from one to thirty amperes. The output of current sensor 92 is provided to the controller 100.

The capacitive storage circuit 94 is employed to store energy from power supply 90, prior to delivering it to electrolytic cell 18. As will be discussed in greater detail below, the use of the capacitive storage circuit 94 advantageously allows relatively high levels of energy to be applied to the fluid over brief intervals and in an efficient manner. Although the storage circuit 94 may include a single capacitor connected across the positive and negative output terminals of power supply 90, in the preferred arrangement, a plurality of electrolytic capacitors are employed and can be selectively connected in parallel in response to inputs from the controller 100. As a result, the capacitive storage circuit 94 may exhibit a variable capacitance of 10,000 to 100,000 micro Farads.

The energy delivered to the electrolytic cell 18 from the capacitive storage circuit 94 exhibits an exponential decay expressed in the following manner. Assume that the power supply 90 applies an initial voltage $V_1$ to the capacitive storage circuit 94, which has a capacitance C. With the supply 90 momentarily disconnected from circuit 94, the voltage V applied to a resistive load R (such as the fluid between electrodes) will then decay with time t in accordance with the expression:

$$V(t) = V_1 e^{-t/RC} \qquad (4)$$

As will be described in greater detail below, the exponential decay of the voltage applied to the electrolytic cell 18 causes a continuous range of voltages to be applied across the electrodes 28 of the electrolytic cell 18 for a given water resistivity. From equations (1) and (4), it will be appreciated that the current flowing between the electrodes similarly decays exponentially over a range of values. This range of voltages and currents is preferably selected to ensure the enhanced ability of cell 18 to achieve a number of desired performance characteristics.

The discharge of energy from the capacitive storage circuit 94 to cell 18 is controlled, in part, by the power switching circuit 96. The switching circuit 96 may include, for example, one or more electromechanical relays that receive electrical inputs from controller 100 and respond by mechanically opening and closing switches connected between the storage circuit 94 and the cell 18. In the preferred arrangement, the power switching circuit 96 includes one or more power transistors.

The inverter 98 is coupled between the power switching circuit 96 and the electrolytic cell 18 to allow the polarity of the voltages applied to the electrodes 28 in cell 18 to be reversed, along with the direction of current flow therebetween. More particularly, as will be described in greater detail below, a first group of nine electrodes 28 may be initially connected to the positive terminal of the power supply 90 for use as anodes, while a second group of eight electrodes are connected to the negative terminal of supply 90 for use as cathodes. The inverter 98 receives periodic inputs from the controller 100 and responds by alternatively connecting the two groups as anodes and cathodes, to increase electrode life. Although the inverter may take any of a variety of forms, in the preferred arrangement, the inverter is a relay.

As will be appreciated from the preceding discussion, the controller 100 is employed to regulate the operation of a variety of different components of the control circuit 20. In one embodiment, the controller 100 includes a microprocessor 101, read only memory (ROM) 103 for storing program instructions to be executed by microprocessor 101 random access memory (RAM) 105 for storing data processed by microprocessor 101, and suitable interfaces 107 for allowing microprocessor 101 to communicate with the remaining components of the control circuit 20. Each of these components is of conventional design.

The flow sensor 102 is employed to monitor the flow of fluid between the fluid source 12 and the supplied environment 14. In that regard, the flow sensor 102 may be positioned in fluid source 12, supplied environment 14, or anywhere in between, but is functionally illustrated as part of the control circuit 20 in FIG. 4. Although a variety of different constructions may be employed, in the preferred arrangement, the flow sensor 12 is a flow switch.

Having reviewed the basic construction of the electrolytic cell 18 and control circuit 20, their combined operation to achieve the desired electrolytic filtration of the fluid will now be described in greater detail. In that regard, the controller 100 controls the various components of control circuit 20 in accordance with the instructions represented in the flow chart of FIG. 5 to provide a sequence of pulses of electrical energy to electrolytic cell 18. These pulses are illustrated graphically in FIG. 6 and are characterized by a repetition rate $r_1$, a pulse duration $T_1$, an initial voltage $V_1$ stored across the capacitive storage circuit 94, a voltage $V_2$ across the capacitive storage circuit 94 at the time the pulse is interrupted by the power switching circuit 94, and a decay rate determined in accordance with equation (4).

As described below, the various parameters of the pulses are controlled to allow a desired average current to be established and maintained between the electrodes 28 substantially independent of variations in fluid resistivity. The control circuit 20 also allows a range of voltages and currents to be applied between the electrodes 28 of cell 18 during each pulse, ensuring that system 16 is able to adequately remove impurities, kill biological materials, and alter the fluid's chemical composition.

Returning again to the operation of the system 16, as will be appreciated, the ROM 103 of controller 100 is preprogrammed with instructions for use by the microprocessor 101 in controlling the operation of the cell 18. At block 104 of FIG. 5, the operation of the circuit 20 is initialized by, for example, the operator's input of information into RAM 105 and/or the microprocessor's accessing of previously stored information.

For example, the magnitude of initial voltage $V_1$ is stored in RAM 105 and may be on the order of 60 volts DC. The operator typically also stores an indication of the desired average current flow $I_1$ between electrodes 28 in RAM 105. In that regard, the desired average current $I_1$ may be established at roughly 17–20 amperes. The operator may further provide RAM 105 with an indication of the desired recurrence rate $r_1$, as well as the desired voltage range or current range to be applied between electrodes 28 during each pulse. As will be appreciated, if the power supply 90 provides the capacitive storage circuit 94 with a fixed voltage $V_1$, the desired range then determines the "shut-off" voltage $V_2$ at the end of each pulse, in which may approach zero volts DC in some applications.

The voltage and/or current range is selected based upon the nature of the water to be treated and the desired relative performance of the system 16 in removing impurities, killing biological materials, and altering the fluid's chemical composition. In that regard, assume that the fluid is water and includes bacteria and organic chemicals. To kill bacteria, a voltage on the order of 24 volts or more, and a current on the order of 10 amperes is desirable to break down the chemical bonds in the water molecules and, hence, increase the oxygenation of the water. The higher oxygen levels then kill the bacteria. Alternatively, organic chemical reduction may occur more effectively at voltages ranging from 0.4 to 0.9 volts DC. As will be appreciated, other operating levels may also be desirable depending upon the nature of the water characteristic to be treated. By causing each pulse to include instantaneous voltages and, therefore, currents over the entire range, the system 16 is able to achieve each of the objectives relatively well.

Figure 5:
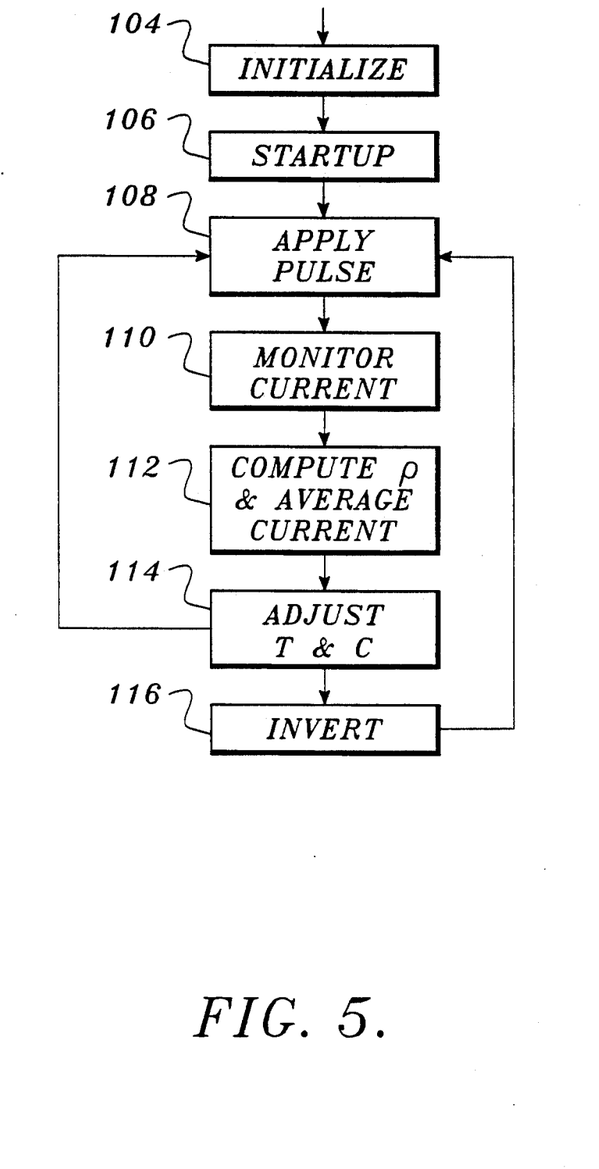
FIG. 5 is a flow chart depicting the operation of the control circuit of FIG. 4.

With the control circuit 20 properly initialized, the microprocessor 101 then initiates operation of the filter system 16 at block 106 of FIG. 5. In that regard, microprocessor 101 accesses RAM 105 to determine the initialized values for $V_1$, $V_2$, $r_1$, as well as some initial value for the capacitance of the capacitive storage circuit 94. The microprocessor 101 then couples power supply 90 to circuit 94, allowing circuit 94 to charge to $V_1$ at block 108. With the capacitive storage circuit 94 charged, microprocessor 101 then disconnects the power supply 90 and provides an output to the power switching circuit 96, causing circuit 96 to connect the storage circuit 94 to electrolytic cell 18.

At that point, energy is provided from the capacitive storage circuit 94 to cell 18. The voltage across the electrodes 28 and the current therebetween, decays exponentially in accordance with equation (4). Energy continues to be applied to the cell 18 until microprocessor 101 causes the power switching circuit 96 to open the connection between circuit 94 and cell 18, when the voltage across the capacitive storage circuit 94 decays to $V_2$. The time T at which this occurs is the pulse duration. The various operations of the control circuit in forming this initial pulse are represented in FIG. 5 as block 108.

During the formation of the first output pulse, the microprocessor 101 monitors the output of current sensor 92 to determine the current flow to the cell, as indicated at block 110. The microprocessor 101 is then able to determine the average current I delivered to the cell 18 at block 112 by evaluating the monitored current i(t) as follows:

$$I = \left[ \int_O^T i(t)dt \right] /T \quad (5)$$

The microprocessor 101 also determines the water's resistance by, for example, dividing the initial voltage $V_1$ by the initially measured current. The resistivity can further be determined, if desired, based upon equation (2) and the known cross sectional area and spacing of the electrodes 28.

If the average current is not equal to the desired average current $I_1$, the microprocessor 101, at block 114, adjusts the pulse duration T to allow the desired average current to be achieved. As will be appreciated from equation (4), however, if all other variables are kept constant, a change in the pulse duration T will alter the shut-off voltage $V_2$. As a result, it may be necessary for microprocessor 101 to simultaneously adjust the capacitance of the storage circuit 94, by switching the number of capacitors connected in parallel across supply 90, to keep the voltage $V_2$ at the desired level. The next pulse is then applied to cell 18 at block 108 at a time determined by the pulse repetition rate.

Once the desired average current $I_1$ has been initially achieved, the microprocessor 101 loops through the operation depicted by blocks 108, 110, 112, and 114 to maintain the desired average current $I_1$ independent of variations in fluid resistivity. In that regard, variations in the fluid's resistance and resistivity will be sensed at block 110 and used by microprocessor 101 to determine the adjustments in capacitance C and pulse duration T required to maintain the desired average current $I_1$ and voltage $V_2$. As one final point, the microprocessor 101 periodically provides an output to the inverter 98 at block 116, causing the polarity of the various electrodes to be reversed.

To illustrate the foregoing operation of control circuit 20 in greater detail, a comparative and qualitative discussion of several different operating circumstances will be provided. In that regard, the voltage pulses applied to the filter system 16 after initial start up are graphically depicted in FIG. 6 for water having a given resistivity. As shown, the capacitor voltage decays from $V_1$ to $V_2$, the pulse duration is $T_1$, the recurrence rate is $r_1$, and an average current $I_1$ is drawn. As will be appreciated, the voltage pulses produce corresponding current pulses through the fluid between the electrodes, with the amplitude of the current pulses being related to the amplitude of the voltage pulses in accordance with equation (1).

Figure 7:
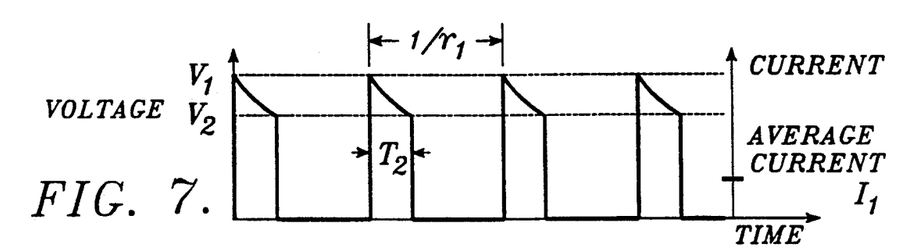
FIG. 7 is a graph illustrating the output pulses produced by the control circuit of FIG. 4 when the resistivity of the fluid being treated is below the initial resistivity.

Now, assume that the resistivity of the water decreases but the same average current $I_1$ is to be maintained. The interelectrode resistance R of the water will increase and, as will be appreciated from equation (4), the voltage across the capacitive storage circuit 94 will decay more slowly, provided that all other variables are kept constant. FIG. 7 depicts the operation of the circuit under these circumstances. While the lower resistivity fluid would normally tend to draw greater current for a given voltage, the average current is maintained constant by decreasing the pulse duration to a level $T_2$. The shut off voltage level $V_2$ is maintained for the shorter pulse duration by adjusting the capacitance C of the capacitive storage circuit 94 in accordance with equation (4), taking into account the changed resistance R.

Figure 6:
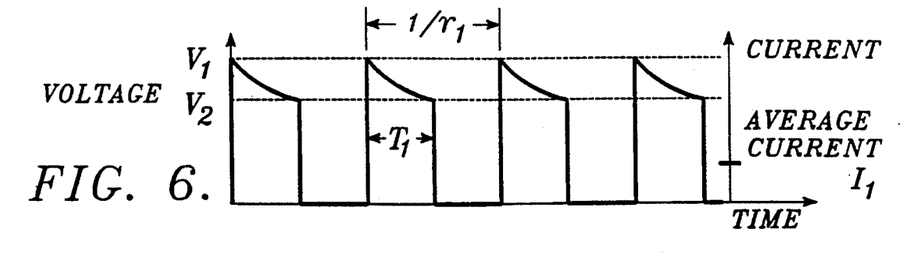
FIG. 6 is a graph illustrating the output pulses produced by the control circuit of FIG. 4 when the fluid being treated has some initial resistivity.
Figure 8:
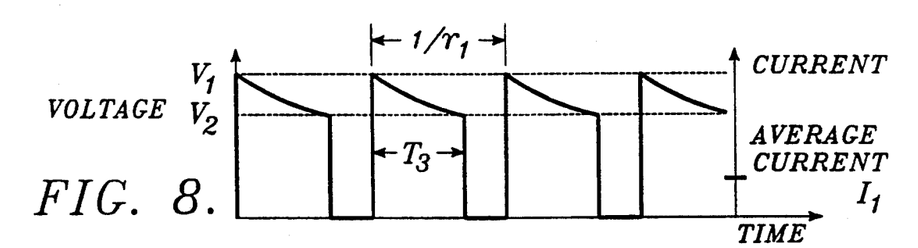
FIG. 8 is a graph illustrating the output pulses produced by the control circuit of FIG. 4 when the resistivity of the fluid being treated is above the initial resistivity.

Suppose, on the other hand, the resistivity of the water increases above the level represented in conjunction with FIG. 6. The resultant effect on the operation of the control circuit 20 is depicted in FIG. 8. Again, the voltages $V_1$ and $V_2$, repetition rate $r_1$, and the average current $I_1$ are to be maintained. Because the higher resistivity water tends to draw less current, however, the average current $I_1$ can be maintained only be increasing the pulse duration to some level $T_3$ greater than $T_1$. Also, to ensure that the voltage $V_2$ is reached at time $T_3$, the capacitive storage circuit 94 must be adjusted in accordance with equation (4), taking into account the simultaneous alteration of the interelectrode resistance R.

Figure 9:
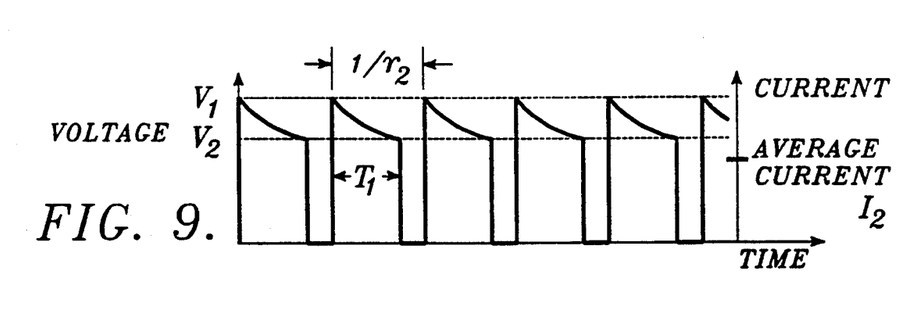
FIG. 9 is a graph illustrating the output pulses produced by the control circuit of FIG. 4 when the average current applied to the electrolytic cell is to be increased.

Now suppose that the water resistivity remains essentially the same as that represented in conjunction with FIG. 6 but the average current is to be increased to some level $I_2$ greater than $I_1$. Such a variation might be desired to, for example, place greater emphasis upon the breaking down of chemical bond by the water molecules to increase oxygenation. As shown in FIG. 9, the voltage $V_1$ remains constant. Also assume that voltage $V_2$ is to remain constant because the range represented between voltage $V_1$ and $V_2$ provides optimal treatment of the water. The pulse duration is kept at $T_1$ and the average current is increased to $I_2$ by decreasing the current repetition rate to some level $r_2$. In the event the water resistivity varies, this average current $I_2$ could then be maintained by altering the pulse duration in the manner previously discussed in connection with FIGS. 7 and 8.

Figure 10:
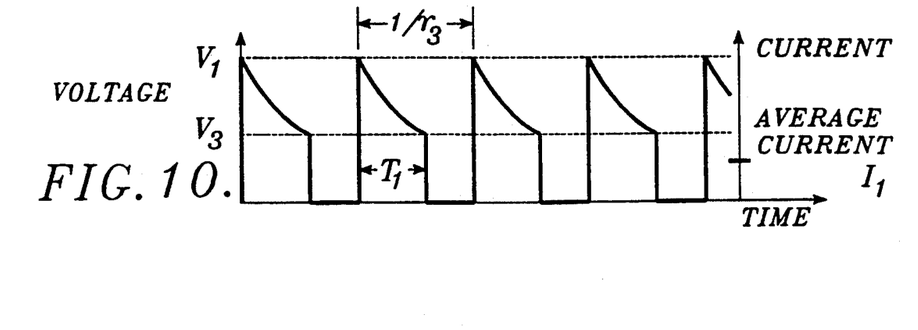
FIG. 10 is a graph illustrating the output pulses produced by the control circuit of FIG. 4 when the range of voltages applied to the electrolytic cell is to be increased.

Suppose instead that it is desired to apply a greater range of voltages to the electrolytic cell 18 than is depicted in conjunction with FIG. 6, while still achieving an average current $I_1$. One potential operation of the control circuit 20 is graphically depicted in FIG. 10. In that regard, the maximum capacitive voltage remains $V_1$. However, the voltage across the capacitive storage circuit 94 is allowed to decay to some voltage $V_3$ that is less than $V_2$. The same pulse duration $T_1$ can be maintained by adjusting the capacitance of the capacitive storage circuit 94. To maintain the desired average current $I_1$, however, the recurrence rate must be increased to some level $r_3$. As will be appreciated, the voltage range could be alternatively narrowed by decreasing the recurrence rate.

As will be appreciated from the foregoing discussion of the various modes of operation of control circuit 20, numerous variations can be implemented. Thus, for example, the magnitude of the initial voltage $V_1$ could be periodically altered to further control the range of voltages or the average current applied to the cell. In that regard, the DC power supply 90 could be constructed so that the initial voltage $V_1$ across the capacitive storage circuit 94 is relatively high for one pulse to treat a first characteristic and then lower for a predetermined number of subsequent pulses to treat a second characteristic. This pattern would then be repeated. The capacitive storage circuit 94 could even be eliminated by sweeping the output of supply 90 over the desired range of voltages.

Also, a variable capacitance need not be available from the capacitive storage circuit 94. In that event, however, the discharge rate will vary with changes in the resistivity of the fluid and it may not be possible to maintain a desired shut off voltage $V_2$ independent of changes in pulse duration.

Those skilled in the art will recognize that the embodiments of the invention disclosed herein are exemplary in nature and that various changes can be made therein without departing from the scope and the spirit of the invention. In this regard, the invention can be employed in the treatment of fluids other than water used, for example, in lubrication, hydraulic, and pneumatic systems. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A method of controlling the operation of an electrolytic system for use in the treatment of a fluid exhibiting a potentially variable characteristic, said method comprising the steps of:
   producing a plurality of pulses of electrical energy for application to the electrolytic system, the plurality of pulses exhibiting parameters including a pulse repetition rate, pulse duration, and pulse amplitude;
   evaluating the potentially variable characteristic of the fluid;
   automatically controlling one of the parameters exhibited by the plurality of pulses in response to the evaluation of the potentially variable characteristic of the fluid.

2. The method of claim 1, wherein said step of evaluating comprises the step of producing an output representative of the fluid's resistivity.

3. The method of claim 2, wherein said step of automatically controlling is performed to allow the electrolytic system to treat the fluid substantially independent of variations in the fluid's resistivity.

4. The method of claim 1, wherein said step of controlling comprises the step of adjusting the pulse duration.

5. The method of claim 1, wherein said step of producing said plurality of pulses comprises the steps of:
   storing electrical energy on a capacitor; and
   repetitively connecting the capacitor to, and disconnecting the capacitor from, the electrolytic system.

6. The method of claim 5, wherein said step of storing electrical energy comprises the step of establishing a voltage across said capacitor at some predetermined initial level and wherein said step of repetitively connecting the capacitor to, and disconnecting the capacitor from, the electrolytic system includes the step of automatically disconnecting the capacitor from the electrolytic system when the voltage across said capacitor has decayed to some predetermined subsequent level.

7. The method of claim 6, wherein said step of repetitively connecting the capacitor to, and disconnecting the capacitor from, the electrolytic system is repeated at the pulse repetition rate.

8. The method of claim 6, wherein the electrolytic system is for use in the treatment of more than one aspect of the fluid and wherein said initial level and subsequent level are selected to enhance the system's ability to treat the more than one aspect of the fluid.

9. The method of claim 8, wherein said initial level is roughly sixty volts and said subsequent level is roughly zero volts.

10. The method of claim 1 including evaluating the potentially variable characteristic of the fluid by sensing a condition indicative of the potentially variable characteristic and supplying an output representing the potentially variable characteristic, and automatically controlling one of the parameters exhibited by the plurality of pulses in response to the evaluation of the potentially variable characteristic of the fluid by supplying the output to a microprocessor and using the microprocessor to control such one of the parameters.

11. The method of claim 10, including using the microprocessor to control the pulse duration.

12. A method of electrolytically treating water in a manner that is relatively independent of variations in the electrical resistivity of the water, said method comprising the steps of:
- positioning the water between at least one pair of electrodes;
- producing a voltage across a capacitor;
- selectively coupling the capacitor to the electrodes, causing the voltage across the capacitor to decay and a current to flow through the water between the at least one pair of electrodes;
- sensing a condition indicative of the resistivity of the water; and
- selectively disconnecting the capacitor from the electrodes when the voltage across the capacitor decays to a predetermined threshold, said steps of selectively coupling and selectively disconnecting being repeated automatically at a predetermined repetition rate and being separated by an interval whose length is dependent upon the sensed condition indicative of resistivity of the water.

13. The method of claim 12, including providing an output representing the resistivity of the water, supplying the output to a microprocessor, and using the microprocessor to trigger the step of selectively disconnecting and selectively coupling the capacitor to the electrodes.

14. The method of claim 13, including using the microprocessor to trigger the steps of selectively disconnecting and selectively coupling the capacitor to the electrodes so as to adjust the pulse duration.

15. A circuit for providing a desired electric current between the electrodes of an electrolytic fluid treatment system, substantially independent of variations in a variable characteristic of the fluid passed between the electrodes and treated by the system, said circuit comprising:
- sensing means for sensing variations in the variable characteristic of the fluid passed between the electrodes;
- delivery means for delivering a plurality of electric current pulses to the electrodes, said electric current pulses exhibiting a pulse duration, pulse repetition rate, and pulse amplitude; and
- control means, responsive to said sensing means, for automatically controlling said delivery means to ensure that the desired electric current provided to the electrodes remains substantially independent of variations in the variable characteristic of the fluid passed between the electrodes.

16. The circuit of claim 15, in which the sensing means includes means for providing an output representing the variable characteristic, the control means including a microprocessor receiving said output and controlling the delivery means.

17. The circuit of claim 15, wherein said sensing means is for sensing a completion indicative of variations in the resistivity of the fluid.

18. The circuit of claim 17, wherein said sensing means is for sensing a condition indicative of variations in the amplitude of the current pulses delivered to the electrodes.

19. The circuit of claim 15, wherein each current pulse has a start point and an end point and the pulse amplitude decays from a start amplitude at the start point to an end amplitude at the end point, said control means being for controlling said delivery means to ensure that the pulse repetition rate and end amplitude are established at some predetermined levels.

20. The circuit of claim 19, wherein said electrolytic fluid treatment system is for use in the treatment of more than one aspect of the fluid and wherein said start amplitude and said end amplitude are selected to enhance the system's ability to treat the more than one aspect of the fluid.

21. The circuit of claim 20, wherein said start amplitude is roughly thirty amperes and said end amplitude is roughly zero amperes.

22. The circuit of claim 19, wherein said control means is further for controlling the pulse duration exhibited by said current pulses in response to said sensing means to ensure that the average current provided to the electrodes remains substantially independent of variations in the resistivity of the fluid passed between the electrodes.

23. The circuit of claim 15, wherein said delivery means comprises a capacitor for storing energy and switching means for selectively connecting said capacitor to and disconnecting said capacitor from the electrodes.

24. Apparatus for electrolytic treatment of a fluid that may exhibit a varying resistivity, said apparatus comprising:
- at least one pair of electrodes, said electrodes defining a fluid flow path therebetween;
- a capacitor for storing electrical energy for delivery to said pair of electrodes;
- a switching circuit for causing energy stored by the capacitor to be delivered to said pair of electrodes as a plurality of current pulses;
- an ammeter for producing an output representative of the current pulses delivered to said pair of electrodes;
- a control circuit for automatically controlling said switching circuit in response to the output of said ammeter.

25. The apparatus of claim 24, wherein said current pulses exhibit a plurality of characteristics and wherein said control circuit and switching circuit are for cooperatively controlling at least one of said plurality of characteristics.

26. The apparatus of claim 25, wherein said characteristics exhibited by said current pulses include duration, amplitude, and repetition rate and wherein said control circuit and switching circuit are for cooperatively establishing amplitude and repetition rate at some predetermined levels and for cooperatively establishing duration in response to the output of said ammeter.

27. A method of electrolytically treating several aspects of water which method comprises the steps of:
- passing the water between at least one pair of electrodes;
- applying a varying voltage of between sixty volts and zero volts across the electrodes to effect the desired treatment of the water by producing a voltage across a capacitor, selectively coupling the capacitor to the electrodes, causing the voltage across the capacitor to decay and selectively disconnecting the capacitor from the electrodes when the voltage across the capacitor decays to a predetermined threshold; and
- sensing the conductivity of the water, said steps of selectively coupling and selectively disconnecting being repeated automatically at a predetermined repetition rate and being separated by an interval of time whose length is dependent upon the sensed conductivity of the water.

* * * * *

UNITED STATES PATENT AND TRADEMARK OFFICE
CERTIFICATE OF CORRECTION

PATENT NO. : 5,324,398
DATED : June 28, 1994
INVENTOR(S) : R.K. Erickson et al.

It is certified that error appears in the above-indentified patent and that said Letters Patent is hereby corrected as shown below:

| COLUMN | LINE | | |
|---|---|---|---|
| [56]<br>(Col. 2) | Ref. Cited<br>(U.S. Pat. Docs.) | Insert --4,842,724 06/1989 Bray et al. .....210/104-- | |
| [56]<br>(Col. 2) | Ref. Cited<br>(U.S. Pat. Docs.) | "204/152" should read --104/152-- | |
| [56]<br>(Col. 2) | Ref. Cited<br>(U.S. Pat. Docs.) | Insert --5,034,123 07/1991 Tanaka et al. .....210/195.1-- | |
| [56]<br>(Col. 2) | Ref. Cited<br>(For. Pat. Docs.) | "European Pat. Off. ." should read --European Pat. Off.<br>......204/149-- | |
| [56]<br>(Col. 2) | Ref. Cited<br>(For. Pat. Docs.) | "Fed. Rep. of Germany ." should read --Fed. Rep. of Germany<br>......204/149-- | |
| Claim 17 | 2 | "completion" should read --condition-- | |

Signed and Sealed this

Twenty-second Day of November, 1994

Attest:

BRUCE LEHMAN

Attesting Officer        Commissioner of Patents and Trademarks